United States Patent [19]

Priddy

[11] Patent Number: 4,647,632

[45] Date of Patent: Mar. 3, 1987

[54] PRODUCTION OF COPOLYMERS OF α-METHYLSTYRENE

[75] Inventor: Duane B. Priddy, Midland, Mich.

[73] Assignee: The Dow Chemical Company, Midland, Mich.

[21] Appl. No.: 782,604

[22] Filed: Sep. 30, 1985

Related U.S. Application Data

[63] Continuation-in-part of Ser. No. 538,452, Oct. 3, 1983, abandoned, which is a continuation-in-part of Ser. No. 464,268, Feb. 7, 1983, abandoned, which is a continuation-in-part of Ser. No. 457,085, Jan. 10, 1983, abandoned, which is a continuation-in-part of Ser. No. 350,773, Feb. 22, 1982, abandoned.

[51] Int. Cl.$^4$ .............................................. C08F 4/08
[52] U.S. Cl. ...................................... 526/88; 526/347
[58] Field of Search ................................ 526/88, 347

[56] References Cited

U.S. PATENT DOCUMENTS

| | | | |
|---|---|---|---|
| 2,769,804 | 11/1956 | Hanson | 528/501 X |
| 2,989,517 | 6/1961 | Hanson et al. | 526/68 X |
| 3,035,033 | 5/1962 | Schweitzer, Jr. et al. | |
| 3,725,506 | 4/1973 | Bolte et al. | |
| 3,726,849 | 4/1973 | Dance et al. | |
| 3,933,774 | 1/1976 | Newmayer et al. | |
| 4,195,144 | 3/1980 | Mertwoy | 526/347 |

FOREIGN PATENT DOCUMENTS

| | | |
|---|---|---|
| 11693 | 1/1983 | Australia . |
| 1196148 | 9/1985 | Canada . |
| 87165 | 2/1983 | European Pat. Off. . |
| 83101711.6 | 8/1983 | European Pat. Off. . |
| 27081 | 12/1983 | Japan . |

OTHER PUBLICATIONS

Processes for Major Addition-Type Plastics and Their Monomers; Albright, 1974, p. 314.
Preparative Methods of Polymer Chemistry; Sorenson et al, 1961, pp. 157–158.
Textbook of Polymer Science, Billmeyer, 1962, p. 339.
Principles of High-Polymer Theory and Practice, Schmidt et al, 1948, pp. 128–129.

Primary Examiner—Paul R. Michl

[57] ABSTRACT

Copolymers of alpha-methylstyrene and its like alkenyl aromatic monomers containing alpha-methyl substitution in the alkenyl portion of the monomer molecule (to provide alpha-methyl-alkenyl aromatic), particularly the copolymers of α-methylstyrene with styrene, which exhibit excellent homogeneity are produced with anionic catalyst initiation in, most advantageously, solution systems using intensive backmixing, recirculatory sorts of reactor unit apparatus in which to conduct the copolymerization by continuously charging a feed stream to the reactor of the mixed monomers to be copolymerized in which the ratio of α-methylalkenyl aromatic monomer to sytrene or other non-α-methyl-containing-alkenyl aromatic monomer is kept in unusually low relative proportions while keeping the reaction mass in which the copolymer is being formed in nicely homogeneous mixture.

12 Claims, No Drawings

PRODUCTION OF COPOLYMERS OF α-METHYLSTYRENE

CROSS-REFERENCE TO RELATED APPLICATION

This is a continuation in part, of application Ser. No. 538,452, filed Oct. 3, 1983, now abandoned, which is a continuation-in-part of the copending application Ser. No. 464,268, filed Feb. 7, 1983, now abandoned, which is a continuation-in-part of the copending application Ser. No. 457,085, filed Jan. 10, 1983, now abandoned, which is a continuation-in-part of Ser. No. 350,773, filed Feb. 22, 1982, now abandoned.

BACKGROUND OF THE INVENTION

Copolymerized α-methylstyrene-styrene resinous products and analogous, more or less relatively equivalent copolymerizates of various alkenyl aromatic monomer mixtures containing copolymerized α-methylalkenyl aromatic moieties therein are notoriously of a rather difficult nature to satisfactorily prepare, especially in order to obtain advantageously homogeneous resultant products. As is disclosed in U.S. Pat. No. 3,725,506, homogeneous α-methylstyrene-styrene and the like or analogous copolymer of various alkenyl aromatic monomers are generally preferable to provide and work with (as for fabrication purposes) due to their improved heat stability characteristics.

Such copolymers have been prepared using somewhat conventional batch or so-called continuous plug flow processing techniques usually at polymerization temperatures of 60° C. or lower. These known procedures, however, have required feeding to the polymerization equipment employed for the conduction thereof of α-methylstyrene-styrene mixtures (or the like) to be copolymerized in relatively high respective proportional ratios.

Nothing in prior art appears to concern itself with a way to produce extraordinarily homogenous copolymerizates, having very good heat stability, of α-methylstyrene (or like or equivalent α-methylalkenyl aromatic monomers) and styrene (or like or equivalent non-α-methyl-containing-alkenyl aromatic monomers) by anionic polymerization routes in and with solution systems using closely controlled low α-methylstyrene-styrene ratio monomer mixture input feeds into intensive-mixing, recirculatory and the like reactor units in order to thereby have better and more satisfacotry manufactured output in the way so indigenously advantageous as in the present contribution to the art.

FIELD, PURVIEW AND SUMMARY OF THE INVENTION

The immediate step forward in the art concerns production of excellently-homogeneous α-methylstyrene-styrene and the like alkenyl aromatic copolymers having outstandingly good characteristics of inherent heat stability thereabout made directly in process under the influence of anionic catalyst initiation using known basic apparatus and equipment for the purpose, all as hereinafter more fully delineated.

The achievement and provision of all of that which is indicated are amongst the principle aims and objectives of the invention; with even more and additionally other benefits and advantages derivable in and from present practice appearing and becoming more evident in the ensuing description and specification.

Needless to emphasize, the basic principles, limitations, comprehensions and practices relevant to copolymerizates of α-methylstyrene and styrene (and the like), anionic polymerization and copolymerization of alkenyl aromatic monomers and monomer mixtures (including in solvent systems), anionic catalyst initiators, recirculated coil and continuous backmixed and the like intensive mixing reactor systems for polymerization operations and so forth (including use and application of same) are so widely known and of such good purchase by those skilled in the art that fully detailed elaboration thereon is neither made nor attempted herein; the same being unnecessary for thorough understanding and recognition of the advance contributed and possibilitated by and with the instant development.

The present invention comprises a process for preparing a copolymer comprising from about 10 to about 70 percent by weight of copolymerized units of at least one monomer of the formula:

with the balance comprising copolymerized units of at least one other monomer of the formula:

wherein Ar in both formulas (1A) and (1B) is selected from the group consisting of unsubstituted aromatic radicals and alkyl-ring substituted aromatic radicals of from 6 to 10 carbon atoms comprising:

(A) continuously charging a monomer mixture comprising monomers 1A and 1B in the weight ratio 1A:1B of about 0.1 to 9.0 to a reaction mixture maintained in a generally homogeneous condition in a reactor operating under anionic polymerization conditions in the presence of an anionic polymerization initiator at a temperature from about 70° to about 120° C. so as to maintain the amount of formula 1B monomer in the reaction mass exiting the reactor at a level of not more than about 10 percent of the amount of the formula 1B monomer added to the reactor;

(B) holding the concentration of completed polymerization in the reaction mass to between about 30 and about 70 weight percent; and (C) continuously withdrawing the reaction mass from the reactor and recovering the copolymer.

Suitable materials and equippage for application and use; as well as working proportional details, preparation conditions and parameters and other significant specifics of the invention are also set forth in the ensuing description and specification.

Particularized Description of the Invention

The present invention involves the feeding or introduction of a very low α-methylalkenyl aromatic monomer content mixture of alkenyl aromatic monomers to be copolymerized as the feed stream input to an anionically-catalyzed or -initiated reaction mass, most advantageously comprised as a solution polymerization system, which is copolymerized in the procedure using intensively-mixing and backmixed, continuous-mode-operational and/or -accommodating, recirculated coil or backmixed continuous stirred tank and the like or equivalent reactor units wherein the reaction mass is maintained in a constantly and uniformly homogeneous condition for the process conducting purpose until adequate production of homogeneous copolymerizate product is in form ready for withdrawal from the reactor unit and subsequent finishing and solid copolymer product recovery operations.

Very homogeneous α-methylstyrene-styrene and the like alkenyl aromatic copolymeric resinous products are thus produced having very good heat stability characteristics thereabout; with reliably good and consistently reproducable results obtainable in practice of the invention with literally no important adjustments or changes in assembly or use of the involved apparatus required for its purpose and in the material handling techniques therein entailed.

The copolymerizate products produced with such excellent and not-normally-typical homogeneity therein by practice of the present invention are alkenyl aromatic copolymers containing, copolymerized in the resulting copolymer molecule, between about 10 and about 70 weight percent (based on composition weight) of an α-methylalkenyl aromatic monomer of the formula:

with the balance of the copolymerizate being copolymerized units of a non-α-methyl-containing-alkenyl aromatic monomer of the formula:

all wherein Ar is an aromatic radical, including various alkyl-ring-substituted aromatics, of from 6 to about 10 carbon atoms. Advantageously, α-methylstyrene is the formula (IA) monomer that is utilized for production of the presently contemplated resinous copolymer products, although it is sometimes of considerable benefit and interest to utilize other ring-substituted α-methylstyrenes for the copolymerized formula (IA) monomeric constituent that is employed such as, by way of illustration, paraisopropenyltoluene. It is frequently preferable to utilize styrene as the formula (IB) monomer to be copolymerized although other species of formula (IB) monomers may also be suitably employed such as vinyl toluene, the dimethyl styrenes, t-butyl styrene, vinyl naphthalene and so forth. Of course, various mixtures of given Formula (IA) monomers or given formula (IB) monomers, or both (and especially those respectivley including α-methylstyrene or styrene or both) maybe copolymerized in practice of the present invention to provide the advantageous homogeneous copolymer products capable of being so obtained.

It is frequently more desirable to prepare copolymer products having from about 10 to about 40 weight percent of the formula (IA) monomer or monomer mixtures copolymerized therein.

The polymerization initiators utilized in the polymerization process contemplated in practice of the present invention are best when soluble in the reaction mass undergoing copolymerization. They are generally the well known organometallic anionics utilized for polymerization initiating purposes including, by way of illustration: n-butyl-lithium; sec.-butyl-lithium; and/or the like or equivalent catalysts, used in conventional effective amounts, as has been disclosed and explained in U.S. Pat. Nos.: 3,322,734, 3,404,134, 4,172,100, 4,172,190, 4,182,818, 4,196,153, 4,196,154, 4,200,718, 4,201,729, and 4,205,016, as well as in many other sources of frequent resort and wide availability. n-Butyl lithium is, usually, a readily-available, convenient and quite satisfactory anionic initiator to utilize for purposes of present practice.

It is operationally and productively possible in practice of the present invention to produce the homogeneous copolymerizate products by so-called "mass" or "bulk" polymerization techniques wherein the monomeric or incompletely-polymerized monomer constituents provide the fluid vehicle for the reaction mass. However, it is generally more advantageous and desirable to utilize solution polymerization techniques for implementation of the desired copolymerization. In such cases, the solvent employed is fed in along with the monomer mixture charge being made to the reaction mass in the polymerization apparatus employed; appropriate proportions being of course provided in and for the procedure. When solution polymerization is followed, ethyl benzene is a very good solvent to utilize for monomer mixture dilution in practice of the invention. Many others, nonetheless, can also be utilized in conventional amounts normally employed for the anionic polymerization of styrene. Besides prerequisite dissolving power, the solvent employed must not interfere with function of the anionic initiator. Thus, the solvent should not have interfering components (at least in deleterious proportions) such as oxygen containing or active-hydrogen constituents. Boiling point is also significant in solvent selection. Fluids too volatile may require overly-expensive and undesirable pressure-handling capability of the involved process equipment. On the other hand, "high boilers" tend to cause removal problems in product recovery. As to boiling point characteristics and freedom from catalyst interference, benzene, toluene, xylene and cumene or mixtures thereof are suitable alternatives to ethylbenzene. The quantity of solvent utilized relative to the amount of monomer mixture being fed into and/or present in the reaction mass can oftentimes be advantageously on about an equal part by weight basis. However, this can oftentimes be acceptably varied from a 2:3 to 3:2 respective monomer mixture/solvent pbw relative range; and even 1:8 to 8:1 respective parts by weight monomer/solvent ratios may be tolerable.

Monomers of formula IA can be used as solvents in polymerization in acordance with the present invention as the polymerization is conducted at temperatures above the ceiling temperatures of monomers of formula IA.

Recirculated coil (and the like or equivalent) reactors of the type similar to those disclosed and described in U.S. Pat. Nos.: 3,035,033 and 3,838,139 are generally suitable for use in conducting the low formula (IA)/formula (IB) monomer mixture feed input technique of the present invention that are so beneficially adhered to. In and with use of these, it is of utmost desirability for the apparatus involved to be readily capable (as has been indicated) to thoroughly mix together all parts and segmental portions of the reaction mass mixture present in the reaction zone; this being usually accomplished by means of stirrers or agitators capable of readily and efficiently and effectively transferring the reaction mass both from the upper to the lower part of the involved reaction zone in the equipment, and vice versa.

Normal 70°–120° C. or so operating temperatures (with reaction zone residence times of the reaction mass in the reactor usually being not more than about 3 or so hours) for any given anionic copolymerization that is involved can be utilized in practice of the process of the present invention; and other ordinarily-utilized means and materials likewise employed (such as the use of the initiator dispersant which, by way of typification, is commonly n-heptane for n-butyllithium).

There are three (3) factors of crucial and critical importance in the material handling and control aspects involved in optimized practice to secure desired results in practice of the present invention. These are:

(1) the part by weight ratio of formula (I)A monomer to formula (IB) monomer in the monomer mixture feed stream being charged into the reaction mass in the reaction zone of the reactor should be in the respective ratio range of 0.1 to 9.0;

(2) the amount of formula (IB) monomer in the reaction mass exiting the reactor should be maintained at a level of not more than about 10 weight percent preferably not more than about 2 weight percent of the amount of the formula IB monomer added to the reactor; and (3) the concentration of completed copolymer in the reaction mass should be kept in the range of between about 30 and about 70 weight percent.

In addition, when extremely high conversions of formula 1 B monomer are achieved, i.e., in the preferred embodiment wherein the amount of formula 1B monomer exiting the reactor is maintained at a level of not more than about 2 weight percent of the amount of formula 1B monomer charged to the reactor, it is advantageous to employ highly purified reaction components. Most preferably, reaction inhibiting contaminants such as water, alcohol, styrene oxide, ketone, and aldehyde contaminants in the feed stream should be maintained at a level less than about 1.0 ppm and preferably less than about 0.1 ppm respectively. Suitable purity levels may be attained by known techniques such as vacuum distillation of the reaction components or contacting them with molecular sieves, alumina or aluminum alkyl compounds and combinations of the above techniques.

One of the very practical consequences of the of Criterion (1) above employing a solvent at a lower temperature that is of significant benefit and convenience is that it minimizes the amount of formula (IA) monomer, such as α-methylstyrene in the copolymerized reaction mass which is generally less volatile than the formula (IB) monomer, such as styrene, with which it is copolymerized therefore making the formula (IA) monomer residue much more difficult to vaporize out of the effluent reaction mass being withdrawn from the reactor unit for resin product finishing operations, particularly in the important devolatilization step therein involved.

And, by way of emphasizing recapitulation, another essential for good results from practice of the invention is the keeping of the reaction mass mixture undergoing the anionic copolymerization in a very thoroughly homogeneous condition throughout performance of the production operation.

Polymerization in accordance with the present invention can be optimized to provide maximum amount of polymer per unit of reactor, or, if desired, can be optimized to provide the maximum quality of polymer per unit of reactor.

If crystal clarity and minimum yellowness is desired, polymerization should be conducted using a minimum amount of lithium initiator. For maximum amount of polymer, greater quantities of the lithium initiator are used. One can obtain a polymer of des red molecular weight distribution using smaller amounts of lithium by incorporating a chain transfer agent. Very convenient chain transfer agents are methyl benzenes, such as toluene, all of the xylene isomers, hemimellitene, pseudocumene, mesitylene, methylethylebenzene and the like. Desirably, the boiling point of such chain transfer agent preferably is below 200° C. and preferably below about 165° C. So if prime color-free polymer is desired, low initiator level with chain transfer agent provides optimum product. If maximum efficiency of the reactor is required, without regard to the color of the polymer, higher levels of lithium initiator are employed. For maximum quantity in a color sense, conversion of monomer to polymer as low as 90 percent may be utilized, whereas in the event that some color in the polymer can be tolerated, maximum efficiency conversions in excess of 99 percent are satisfactory.

Further Exemplification of the Invention

A recirculating coil reactor unit similar to that shown in the above-identified U.S. Pat. No. 3,035,033 was utilized for the making of four (4) separate Runs to prepare copolymeric product for demonstration of the present invention. The reactor was a loop of one inch inside diameter stainless steel tubing having a Northern Gear pump number 4448 operating at 200 revolutions per minute to provide recirculation within the loop. The internal volume of the reactor was 900 milliliters. The tubing of the reactor was wrapped with ¼-inch copper tubing and steam heated. Feed and initiator were pumped into the gear pump. The initiator was n-butyllithium and was handled as a 1.5 weight percent solution in ethylbenzene. The rate of initiator addition was controlled to provide a constant color in the reaction mixture. In each of the Runs, monomer mixtures, solvent and n-butyllithium initiator were fed into the reactor at a rate such that a 1½ hour residence time was had. The effluent from the reactor was continuously devolatilized to obtain the product copolymer resin in each Run. Operational and materials parameters and the results obtained are set forth in the following tabulation.

| Run Number: | 1 | 2 | 3 |
|---|---|---|---|
| Feed Composition by Gas Chromatographic Analysis: | | | |
| Weight % α-methylstyrene | 28 | 10 | 18 |
| Weight % styrene | 41 | 42 | 33 |
| Weight % ethylbenzene | 31 | 48 | 49 |
| Copolymer Composition by Calculation: | | | |
| Weight % α-methylstyrene | 32 | 14 | 22 |
| Weight % styrene | 68 | 86 | 78 |
| Volatile Composition by Gas Chromatograph: | | | |
| Weight % α-methylstyrene | 21 | 6 | 17 |
| Weight % styrene | 0.3 | 0.3 | 0.5 |
| Weight % ethylbenzene | 78 | 93 | 82 |
| Wt. % Solids in Reaction Mass | 60 | 49 | 42 |
| Polymerization Temperature, °C. | 102 | 88 | 75 |
| n-Butyllithium Used in Parts per Million by weight of monomer | 260 | 240 | 130 |
| Weight Average Molecular Weight of Product (by Gel Permeation | 287,000 | 168,000 | 345,000 |

| Run Number: | 1 | 2 | 3 |
|---|---|---|---|
| Chromatography) | | | |

Each of the obtained α-methylstyrene-styrene copolymer products had very good thermal stability characteristics during molding operations and heat exposures testings.

Analogous good results are obtained when other formula (IA) monomers in mixtures with other formula (IB) monomers are utilized and when various mixtures of formula (IA) monomers, including those containing α-methylstyrene, with various mixtures of formula (IB) monomers, including those containing styrene, are employed for production of anionically-initiated copolymerizate products in the same or equivalent sorts of continuous, well-backmixed sorts of recirculating coil or continuous stirred tank reactor assemblies capable of keeping the reaction mass well homogenized while it is in the entirety of its in-process residence therein using NBL or other therewith-replaceable organometallic, anionically-active polymerization initiators for styrene, including mixtures of α-methylstyrene and styrene with such other reactor style assemblies and such other anionic catalyst employing varying reaction conditions within the general metes and bounds above laid out for carrying out practice of the present invention.

Many worthwhile and desirable changes and modifications can readily be made and adapted in specifically altered embodiments in accordance with the present invention without substantial or materially meaningful departation from its apparent and intended spirit and scope, all in pursuance of and accordance with same as it is set forth and defined in the claims hereto appended.

What is claimed is:

1. A process for preparing a copolymer comprising from about 10 to about 70 percent by weight of copolymerized units of at least one monomer of the formula:

with the balance comprising copolymerized units of at least one other monomer of the formula:

$$CH_2=CH\ Ar \qquad (1B),$$

wherein Ar in both formulas 1A and 1B is selected from the group consisting of unsubstituted aromatic radicals and alkyl-ring-substituted aromatic radicals of from 6 to 10 carbon atoms comprising:
  (A) continuously charging a monomer mixture comprising monomers 1A and 1B in the weight ratio 1A:1B of about 0.1 to 9.0 to a reaction mixture maintained in a generally homogeneous condition in a reactor operating under anionic polymerization conditions in the presence of an anionic polymerization initiator at a temperature from about 70° to about 120° C. so as to maintain the amount of formula 1B monomer in the reaction mass exiting the reactor at not more than about 2 percent of the amount of the formula 1B monomer added to the reactor;
  (B) holding the concentration of completed copolymerizate in the reaction mass to between about 30 and about 70 weight percent; and
  (C) continuously withdrawing the reaction mass from the reactor and recovering the copolymer.

2. The process of claim 1, wherein the formula (IA) monomer is α-methylstyrene.

3. The process of claim 1, wherein the formula (IB) monomer is styrene.

4. The process of claim 1, wherein the monomers employed are styrene and α-methylstyrene.

5. The process of claim 1, wherein the initiator is n-butyl-lithium.

6. The process of claim 4, wherein ethylbenzene is employed as solvent.

7. The process of claim 4, wherein isomers of xylene and mesitylene and mixtures thereof are employed as solvent.

8. The process of claim 1 wherein the formula (IA) monomer is paraisopropenyltoluene.

9. The process of claim 1 wherein the reactor is an intensively-mixing and back-mixing, continuous-mode-accomodating, recirculating reactor.

10. The process of claim 1 wherein the anionic polymerization initiator is an organo metallic anionic polymerization initiator.

11. The process of claim 1 wherein the copolymer comprises from about 10 to about 40 percent by weight of copolymerized units of at least one monomer of formula 1A.

12. A mass polymerization process according to claim 1.

* * * * *